(12) United States Patent
Black et al.

(10) Patent No.: US 7,807,307 B2
(45) Date of Patent: Oct. 5, 2010

(54) SYSTEM AND METHOD FOR DISTRIBUTING FUEL TO MULTIPLE FUEL CELLS

(75) Inventors: Gregory R. Black, Vernon Hills, IL (US); Mikhail T. Galeev, Palatine, IL (US); Deven M. Patel, Mundelein, IL (US); Brian A. Redding, Champaign, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 1553 days.

(21) Appl. No.: 11/122,627

(22) Filed: May 5, 2005

(65) Prior Publication Data

US 2006/0251936 A1    Nov. 9, 2006

(51) Int. Cl.
    H01M 8/04    (2006.01)
    H01M 2/10    (2006.01)
    H01M 8/24    (2006.01)
    G06F 15/16   (2006.01)

(52) U.S. Cl. .................. 429/443; 429/428; 429/22; 429/99; 709/200

(58) Field of Classification Search .............. None
    See application file for complete search history.

(56) References Cited

U.S. PATENT DOCUMENTS

| 6,239,508 | B1 | | 5/2001 | Faris et al. |
| 6,665,549 | B1 | * | 12/2003 | Reed .......................... 455/573 |
| 7,221,902 | B2 | * | 5/2007 | Kopra et al. ............... 455/3.05 |
| 2003/0038891 | A1 | | 2/2003 | Polgar et al. |
| 2003/0138679 | A1 | * | 7/2003 | Prased et al. .................. 429/19 |

FOREIGN PATENT DOCUMENTS

JP        2003173808 A    6/2003

OTHER PUBLICATIONS

G. Scheible, J. Schutz, C. Apneseth, "Novel Wireless Power Supply System for Wireless Communication Devices in Industrial Automation Systems", IEEE 0-7803-7474, 2002, 6 pages.

* cited by examiner

*Primary Examiner*—Dah-Wei D Yuan
*Assistant Examiner*—Katherine Turner
(74) *Attorney, Agent, or Firm*—Hisashi D. Watanabe

(57) ABSTRACT

A Personal Area Network (PAN) (100) including multiple communication devices (104, 106, 108) is provided. The communication devices are capable of communicating with each other and a connection point. The communication devices derive energy from multiple fuel cells (110, 112, 114). The PAN is capable of distributing fuel to the multiple fuel cells from a common fuel container (116), if the communication devices are attached to the connection point.

7 Claims, 4 Drawing Sheets

| | HOST DEVICE | COMMUNICATION DEVICE | COMMUNICATION DEVICE | COMMUNICATION DEVICE |
|---|---|---|---|---|
| STATE | ACTIVE | ACTIVE | ACTIVE | ACTIVE |
| POSITION | XXXX | ATTACHED (WIRED) | ATTACHED (WIRELESS) | NOT ATTACHED |
| FUEL STATUS | (gauge) | (gauge) | (gauge) | (gauge) |
| CONTROL VALVE | XXXX | TWO-WAY | ONE-WAY | XXXX |

*FIG. 3*

SYSTEM AND METHOD FOR DISTRIBUTING FUEL TO MULTIPLE FUEL CELLS

FIELD OF THE INVENTION

The present invention relates generally to the field of personal area networks. In particular, the present invention relates to a method and system for distributing fuel to multiple fuel cells in a personal area network.

BACKGROUND OF THE INVENTION

A Personal Area Network (PAN) includes multiple devices such as a computer, phone, Personal Digital Assistant (PDA), headset or earpiece, imager or camera, a body-worn sensor such as a for measuring exercise such as gait, respiration or heart function, or other health related sensors such as blood pressure, blood chemistry, etc, a keyboard, mouse, printer, and so forth. Each of these devices is capable of functioning separately, and may therefore require a separate energy source. A user maintains these energy sources. Typically, these devices are portable and the user has to carry them from place to place. Consequently, the user also has to carry the separate energy source for each device.

Ideally each device is designed so that the energy storage capacity is sufficient for a time of usage which is the same for all of the devices. While the amount of fuel needed is predictable for normal use cases, there are exceptional use cases where certain devices require more energy than normal. There are inevitably situations in which energy replenishment is needed for only one device while the other devices have plenty of available energy, which may be inconvenient or distracting to the user.

Over the last few years, the use of fuel cells as an energy source has increased. Fuel cells work on the principle of converting chemical energy into electrical energy. This principle is also known as electro-chemical conversion of energy. The fuels required for fuel cells may be in gas form, such as hydrogen and oxygen, or they may be in liquid form, such as methanol, or specialized alcohols.

Each fuel cell contains a fuel container as to carry the fuel which requires refilling from a separate fuel storage container, which is inconvenient since it requires the user to manually attach the devices to the separate fuel container whenever the devices run out of fuel. To overcome this problem, conventional solutions include the use of a battery powered PAN devices with a common fuel cell. According to this solution, a common fuel cell provides an electronic connection for charging each of the batteries in the devices. Since the fuel cell supplies energy via charging to the batteries, an electro-chemical conversion first takes place in the fuel cell, and then another electro-chemical conversion takes place in the battery. However, the two electro-chemical conversions in series result in a loss of energy. The reverse transfer of energy from a battery back to a fuel cell is also inefficient and furthermore requires special equipment which may be unduly expensive for the purpose of redistributing energy among personal area network devices.

Accordingly, there is a need for a convenient and more efficient method of supplying or redistributing energy among the devices in a personal area network, by a mechanism that requires only one electrochemical conversion of energy.

BRIEF DESCRIPTION OF THE DRAWINGS

FIG. 3 is a schematic diagram illustrating an exemplary user interface in accordance with the present invention.

DETAILED DESCRIPTION OF THE PREFERRED EMBODIMENTS

The present invention provides a system and method for distributing fuel to a plurality of fuel cells. For one embodiment, the fuel is distributed from a central hub or a common connection point. For another embodiment, a peer-to-peer model is used to distribute the fuel. In the peer-to-peer model, the fuel is distributed from one of the plurality of fuel cells to another of the plurality of fuel cells.

For one embodiment, the fuel cells provide energy to a plurality of communication devices. Further, the communication devices constitute a Personal Area Network (PAN). A PAN is a wireless communication network with a very short range, for example, 10 meters. PANs are used to connect a plurality of communication devices such as phones, Personal Digital Assistants (PDAs), headsets, imagers, sensors, keyboards, mouses, printers, etc., with a computer. The communication devices are detachable and are capable of working independently. Further, the communication devices can be wired or wireless.

For one embodiment, the PAN is capable of distributing fuel to the fuel cells of the communication devices, which are connected to at least one connection point. An example of the connection point, hereinafter referred to as a host device, is a computer.

An aspect of the present invention is to supply energy from the host device to various communication devices in the PAN. The energy is supplied by redistributing fuel from the fuel cell of the host device to the fuel cells of the communication devices. Another aspect of the present invention is to redistribute fuel from the fuel cell of one communication device to the fuel cell of another communication device in a PAN.

Yet another aspect of the present invention is to enable the fuel cells to employ only one electro-chemical conversion. Since the energy is supplied directly by redistribution of fuel, only one electro-chemical conversion is required by each fuel cell.

Figure 1:
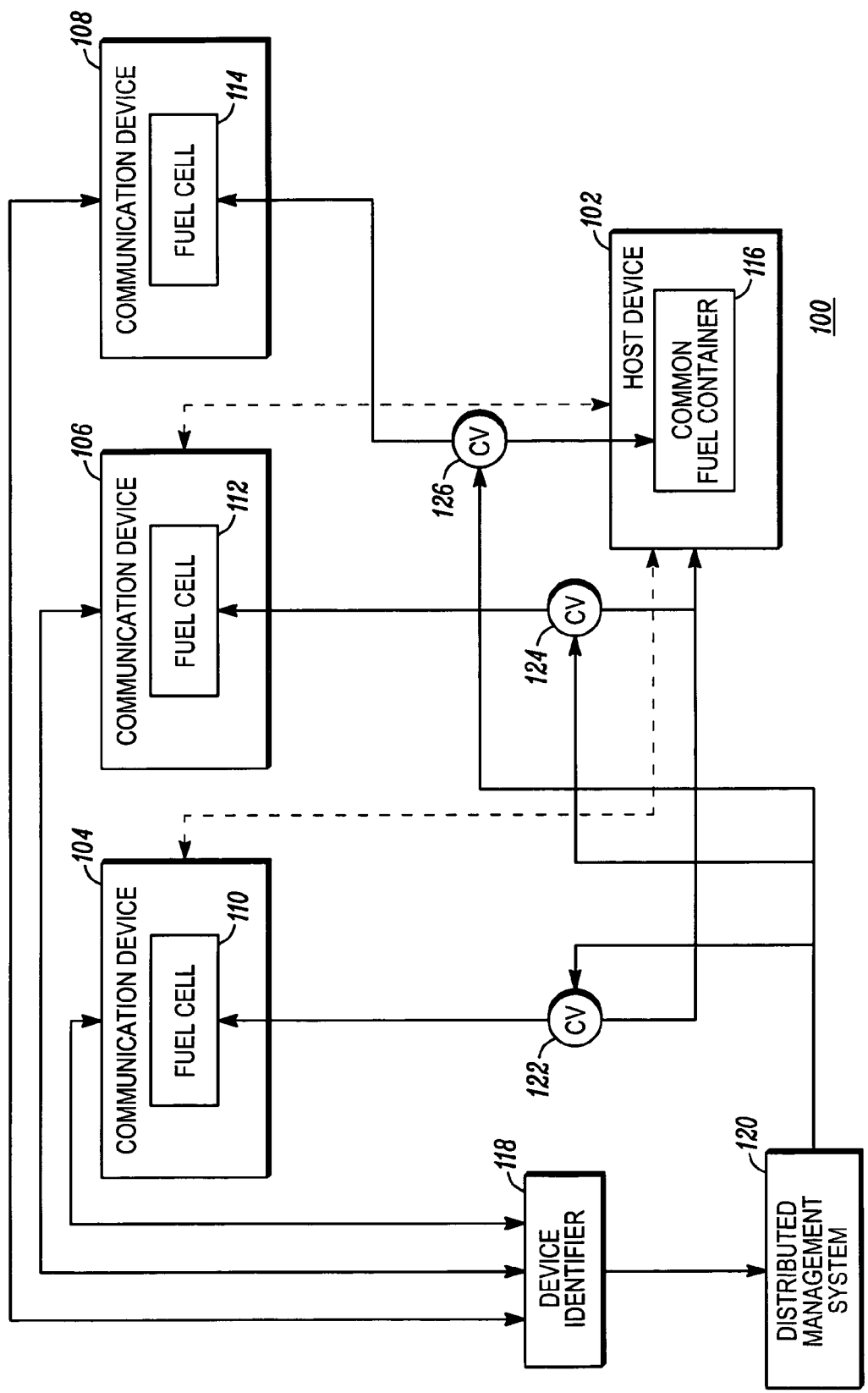
FIG. 1 is a block diagram illustrating exemplary components of a Personal Area Network (PAN) in accordance with the present invention.

Referring to FIG. 1, there is shown a block diagram illustrating exemplary components of a PAN 100. The PAN 100 includes a connection point, hereinafter referred to as a host device 102, and communication devices 104, 106, 108. The communication devices 104, 106, 108 are capable of communication with each other and with the host device 102. The communication devices 104, 106, 108 and the host device 102 are detachable and are capable of functioning independently. It is to be noted that three communication devices have been depicted for exemplary purposes only. The PAN 100 can include one or more communication devices, without diverting from the scope and spirit of the present invention.

The communication devices 104, 106, 108 derive energy from fuel cells 110, 112, 114. For one embodiment, the fuel cells 110, 112, 114 reside within communication devices 104, 106, 108. The fuel cells 110, 112, 114 are connected to a common fuel container 116. The common fuel container 116 provides fuel to the fuel cells 110, 112, 114 and also to the host device 102. For one embodiment, the common fuel container 116 is a fuel cell located within the host device 102.

The common fuel container 116 provides fuel to the fuel cells 110, 112, 114 only if the communication devices 104, 106, 108 are attached to the host device 102. A device identifier 118 identifies the communication devices 104, 106, 108, which are attached to the host device 102. Based on the identification, a distributed management system 120 controls the flow of fuel from the common fuel container 116 to the fuel cells 110, 112, 114. The distributed management system 120 controls the flow of fuel using control valves (CV) 122, 124, 126. Examples of the control valves 122, 124, 126 include pneumatic valves, solenoid valves and gate valves.

The control valves 122, 124, 126 can be passive control valves or active control valves. Passive control valves control the flow of fuel according to a pre-defined configuration. For example, the control valves 122, 124, 126 can be configured in such a manner that the flow of fuel is unidirectional. Therefore, the fuel flows only from the common fuel container 116 to the fuel cells 110, 112, 114, i.e., no fuel flows out of the fuel cells 110, 112, 114. For another embodiment, the control valves 122, 124, 126 are configured to fill each of the fuel cells 110, 112, 114 provided that there is sufficient fuel available from the common fuel container 116. For another embodiment, the control valves 122, 124, 126 are configured to equalize the amount of fuel in each of the fuel cells 110, 112, 114. For another embodiment, the control valves 122, 124, 126 are configured to equalize the amount of fuel relative to the container size in each of the fuel cells 110, 112, 114. For another embodiment, in the case of fuel in gas form, the control valves 122, 124, and 126 equalize the fuel pressure in each of the fuel cells 110, 112, 114. For another embodiment, the control valves 122, 124, 126 are configured to equalize the operation time for the anticipated usage of each of the devices 110, 112, 114.

The active control valves are actively controlled by a user, to control the flow of fuel. This implies that the active control valves can be configured during the process of fuel distribution. For one embodiment, the user actively controls the control valves 122, 124, 126 by using a distributed management system 120.

Figure 2:
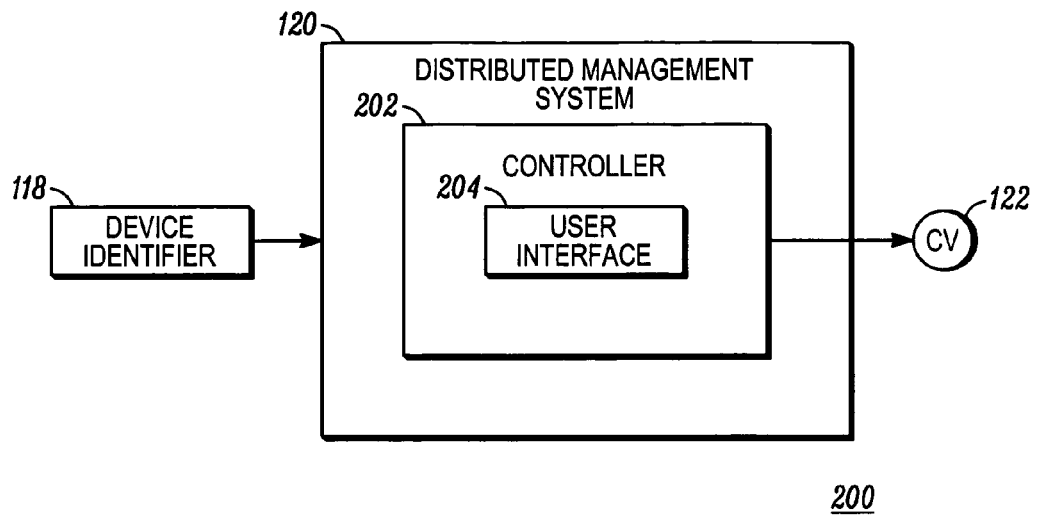
FIG. 2 is a block diagram illustrating exemplary components of a distributed management system in accordance with the present invention.

Referring to FIG. 2, there is shown an example embodiment 200 of the distributed management system 120. The distributed management system 120 includes a controller 202 to actively control the flow of fuel through control valve 122. For various embodiments, the controller 202 controls the flow of fuel through each of the control valves 122, 124, 126. For one embodiment, a user controls the controller 202. For another embodiment, the controller 202 may function by adjusting the pressure in the fuel container while opening and closing the control valves 122, 124, 126. The controller 202 includes a user interface 204, which displays the status of the communication devices 104, 106, 108. The controller 202 may allow the user to open and close the control valves 122, 124, 126, thereby controlling the flow of fuel between the host device 102 and the communication devices 104, 106, 108 connected to it. For various embodiments, the distributed management system 120, the controller 202, and the user interface 204 may be implemented in the form of software modules, hardware modules, or their combinations thereof.

Referring to FIG. 3, there is shown an exemplary user interface 204, in accordance with the present invention. The user interface 204 displays the status of the communication devices 104, 106, 108. The status of the communication devices 104, 106, 108 includes the state and position of the communication devices 104, 106, 108. The state of the communication devices 104, 106, 108 indicates whether they are active or not. The user can control the flow of fuel, based on the state of the communication devices 104, 106 and 108. The position of the communication devices 104, 106, 108 indicates whether they are attached to the host device 102. The communication devices 104, 106, 108 can be attached wirelessly or through wires. The fuel is provided to the communication devices 104, 106, 108, only if the communication devices 104, 106, 108 are attached to the host device 102. For example, referring to FIG. 1, the communication devices 104, 106 are attached to the host device 102. The communication device 108 is detached from the host device 102. Thereafter, the device identifier 118 identifies the communication devices 104, 106. Thereafter, the distributed management system allows the flow of fuel from the common fuel container 116 to the fuel cells 110, 112.

Further, the flow of fuel also depends upon the amount of fuel in the host device 102 and in each of the communication devices 104, 106, 108. Based on these parameters, the user actively controls the flow of fuel through the control valves 122, 124, 126. For example, if the communication device 108 is not attached to the host device 102, the user controls the control valve 126 in such a manner that no fuel flows into the fuel cell 114 of the communication device 108. Also, depending on the amount of fuel in each of the communication devices 104, 106, 108, the user can configure the control valves 122, 124, 126 to be two-way or one-way control valves. The two-way control valves allow fuel to flow in two directions, i.e., the fuel can be directed in and out from the fuel cells 110, 112, 114. The one-way control valve allows the fuel to flow in only one direction, i.e., into the fuel cells 110, 112, 114.

Figure 4:
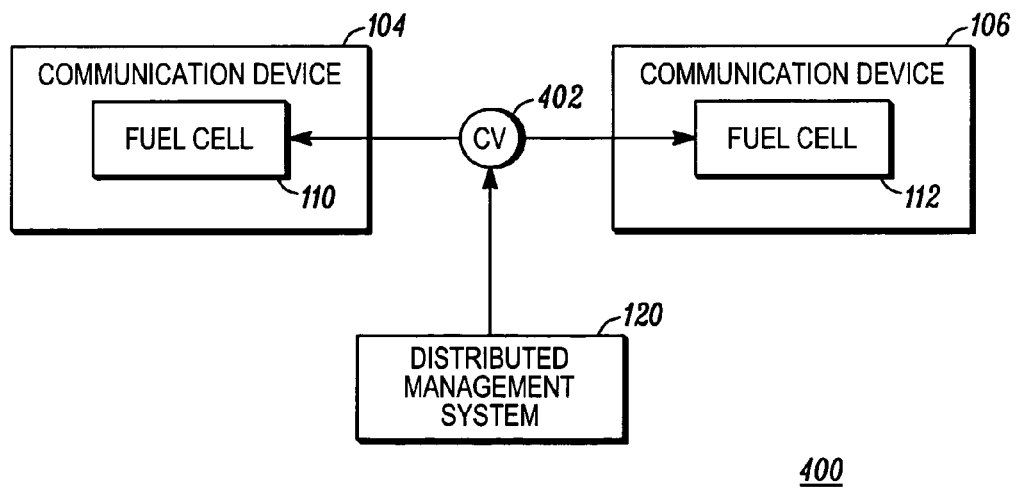
FIG. 4 is a block diagram illustrating an exemplary embodiment of peer-to-peer distribution of fuel in accordance with the present invention.
Figure 5:
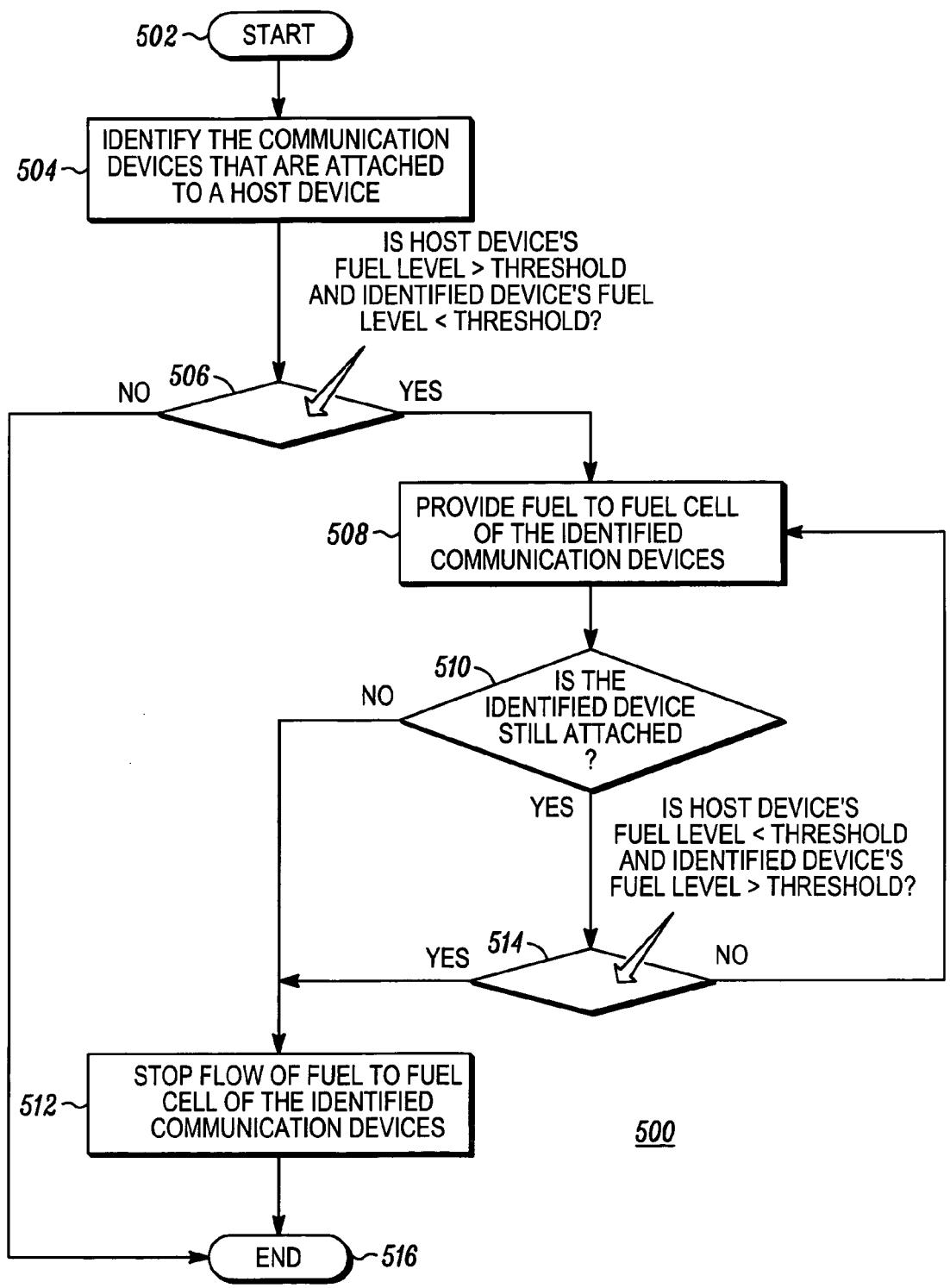
FIG. 5 is a flow diagram illustrating an exemplary method of distributing fuel to a plurality of fuel cells in accordance with the present invention.

Referring to FIG. 4, there is shown an exemplary embodiment of peer-to-peer distribution of fuel to the fuel cells 110, 112. The flow of fuel to/from fuel cell 110 from/to fuel 112 is controlled by the distributed management system 120 by using a control valve 402. For example, if the amount of fuel in the fuel cell 110 is more than a threshold and the amount of fuel in the fuel cell 112 is less than the threshold, the control valve 402 is controlled such that the fuel is provided to the fuel 112 from the fuel cell 110. The value of the threshold can be a pre-defined or a user-defined value. For one embodiment, the fuel is provided until either the amount of fuel in the fuel cell 110 falls below the threshold, or the amount of fuel in the fuel cell 112 rises above the threshold.

Referring to FIG. 4, there is shown an example embodiment 400 of peer-to-peer distribution of fuel to the fuel cells 110, 112. The flow of fuel to/from fuel cell 110 from/to fuel 112 is controlled by the distributed management system 120 by using a control valve 402. For example, if the amount of fuel in the fuel cell 110 is more than a threshold and the amount of fuel in the fuel cell 112 is less than the threshold, the control valve 402 is controlled such that the fuel is provided to the fuel 112 from the fuel cell 110. The value of the threshold can be a pre-defined or a user-defined value. For one embodiment, the fuel is provided until either the amount of fuel in the fuel cell 110 falls below the threshold, or the amount of fuel in the fuel cell 112 rises above the threshold.

If the amount of fuel in the host device 102 is more than the threshold, and the amount of fuel in the communication devices 104 and 106 is less than the threshold, step 508 is executed. At step 508, fuel is provided to the fuel cells of the identified communication devices, i.e., the communication devices 104 and 106. Thereafter, at step 510, the communication devices 104 and 106 are checked to ensure that they are still attached to the host device 102. If the communication devices 104, 106 are not attached to the host device 102, the flow of fuel to the fuel cells of the identified communication devices 104, 106 is stopped at step 512. Thereafter, the process is terminated at step 516.

Referring to step 510, if the communication devices 104, 106 are still attached to the host device 102, step 514 is executed. At step 514, the amount of fuel in the communication devices 104, 106 and the host device 102 is checked. If the amount of fuel in the host device 102 is not less than the threshold and the amount of fuel in the communication devices 104, 106 is not more than the threshold, step 508 and step 510 are repeated.

If the amount of fuel in the host device 102 is less than the threshold, or the amount of fuel in the communication devices 104, 106 is more than the threshold, the flow of fuel to the fuel cells of the identified communication devices 104, 106 is stopped at step 512. Thereafter, the process is terminated at step 516.

The present invention described above offers various advantages. A single fuel container is provided to distribute fuel to the fuel cells of the communication devices in the PAN. Each communication device gets its energy replenished automatically when the communication device is docked onto the host device in the PAN. The energy to the multiple devices is supplied by redistributing the fuel. The flow of fuel can be controlled actively by the user. A single electrochemical conversion results in a reduced loss of energy.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A personal area network (PAN) comprising:
a plurality of communication devices configured to operate within the PAN, the plurality of communication devices being capable of communicating with each other, the plurality of communication devices including a plurality of fuel cells, being capable of attachment to, and detachment from, at least one connection point, wherein the PAN is capable of distributing fuel between plurality of communication devices while the plurality of communication devices are attached to the at least one connection point; and
control valves configured to control the flow of fuel and equalize the fuel in each of the plurality of fuel cells.

2. The system of claim 1, further comprising a device identifier configured to identify the plurality of communication devices that are attached to the at least one connection point.

3. The system of claim 1, further comprising a distributed management system configured to distribute fuel between the plurality of fuel cells associated with each of the plurality of communication devices that are attached to the at least one connection point.

4. The system of claim 1, wherein the control valves are configured such that the flow of fuel is unidirectional.

5. The system of claim 1, wherein the distributed management system comprises a controller configured to actively control the control valves.

6. The system of claim 5, wherein the controller comprises a user interface to display the status of each of the plurality of communication devices.

7. The system of claim 6, wherein the status comprises the state and position of each of the plurality of communication devices and the fuel distribution in the plurality of fuel cells.

* * * * *